United States Patent Office 3,444,351
Patented May 13, 1969

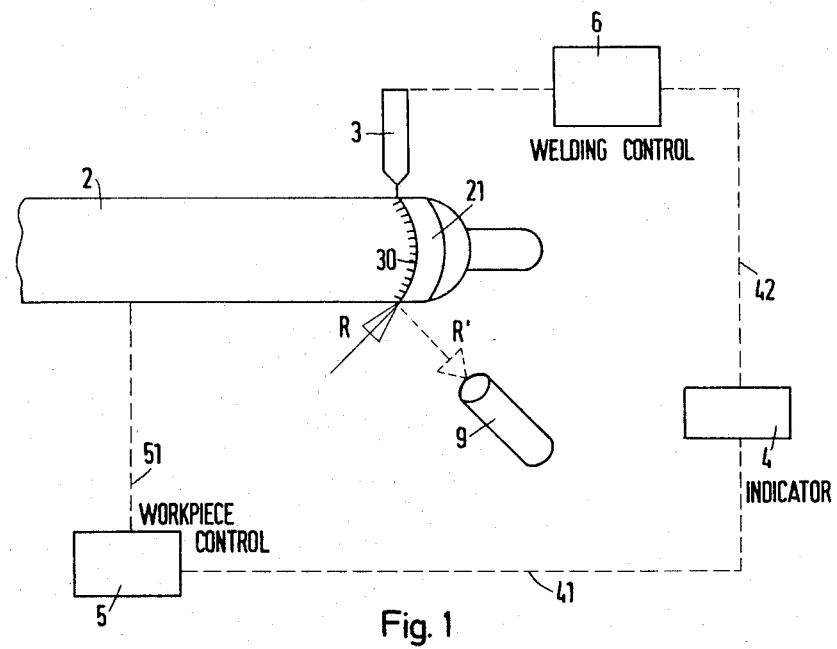
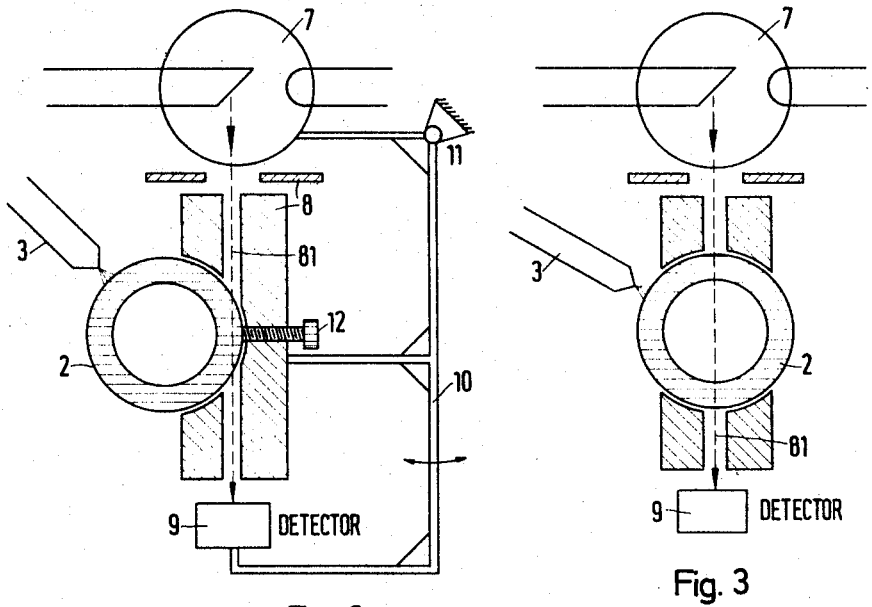

3,444,351
METHOD AND APPARATUS FOR WELDING AND CHECKING TUBULAR WORKPIECES
Heinz Stehle, Werner Kaden, and Alfred Schaal, Erlangen, Germany, assignors to Siemens Aktiengesellschaft, Erlangen, Germany, a corporation of Germany
Filed June 8, 1966, Ser. No.. 556,180
Claims priority, application Germany, June 11, 1965, S 97,566; May 6, 1966, S 103,657
Int. Cl. B23k 9/12, 9/16, 31/02
U.S. Cl. 219—124          13 Claims

ABSTRACT OF THE DISCLOSURE

Method of coaxially joining tubular workpieces, such as the end cap and envelope tube of a nuclear fuel rod, by electrically welding a peripheral seam and checking the weld quality by radiation includes the steps of rotating the workpieces about their axis at substantially constant speed within a protective atmosphere and adjacent to a welding electrode to produce the weld, simultaneously subjecting the weld in still hot condition to continuous radiation, checking to obtain an indication of weld quality, and effecting a work control in accordance with the indication; and apparatus for carrying out the method.

---

Our invention relates to method and apparatus for welding tubular workpieces and checking the quality of the welding work by X-rays or other radiation. In a more particular aspect, the invention concerns the welding and simultaneous checking of circular welding seams between coaxial workpieces, particularly those joining an end cap to the envelope tube of a nuclear fuel rod.

The envelope tubes of nuclear fuel rods are closed at both ends by caps which must be gas-tightly sealed. As a rule the caps are attached by electrical welding in argon or other protective gas. This requires performing the welding operation in a gas-filled chamber with the aid of a nonconsumable welding electrode of tungsten. Since the seal produced by the weld must be perfectly tight, the welds are subsequently checked by X-rays. This requires a relatively large amount of time because the enveloped fuel rods must first be taken out of the welding apparatus and then be irradiated by X-rays, whereafter the exposed X-ray films must be developed before they afford recognizing any defects. If the weld is thus formed to have pores or other faults, the defective work is returned into the protective gas chamber and subjected to remedial welding. Experience has shown that a large proportion of originally objectionable welds can thus be perfected. It is virtually infeasible, however, to automate the checking and rewelding operation, aside from the fact that checking the X-ray photograph largely involves subjectivities on the part of the inspecting person.

If the walls of the envelope tubes are very thin, the above-described checking by means of X-rays fails completely, because then the probability of recognizing faults becomes too slight, particularly with fuel rods of large diameter. Since the trend of nuclear reactor developments is toward using thinner envelope tubes, and since further the quality requirements to be met by the welding of such thin-walled materials are extremely exacting, there exists a great demand for a checking method capable of satisfactory performance with such workpieces.

It is an object of our invention to devise a combined welding and checking method that meets the just-mentioned demand to the full extent.

To this end, and in accordance with a feature of our invention, we perform the electrical welding of a circular seal between coaxial workpieces, such as the end cap and the envelope tube of a nuclear fuel rod, while jointly rotating the two pieces of the work about their common axis at substantially constant speed within the protective atmosphere and adjacent to the welding electrode which produces the welded seam during the rotation. Simultaneous with the rotation and welding of the work, we subject the weld, while it is still in hot condition, to continuous checking by X-rays or other suitable radiation to obtain an indication of the weld quality, this indication being suitable for a manual or fully automatic correction of the weld or for separating excessively defective products from the production process.

According to the invention, therefore, the welding and checking take place in a single course of operation, a photographic film for investigating the weld being not required. It rather suffices to sense and measure the intensity of the radiation with the aid of a radiation sensor, and to amplify and indicate this intensity. Consequently, the instantaneous results of the continuous checking operation can be seen at a glance from the indicating instrument. For correctly interpreting the indicated values, it is desirable to previously calibrate the indicating scale of the instrument so that the deflection of the pointer is indicative of the size and number of the pores within the weld being produced. That is, the presence of pores causes a corresponding change in intensity at the radiation detector, which in turn causes a change in indication of the instrument.

Since the result of the checking operation comes about simultaneously with the welding seam, any repeated welding, if necessary, can be carried out immediately. A corresponding control of the welding apparatus may then be effected by hand or automatically under control by the indicating instrument. Automation merely requires entering into the instrument a limit value so that when this limit value is not reached or—as the case may be—is exceeded once or several times, repeated welding operation is released. If desired, such subsequent welding may then be performed with different, previously set welding data. The automation may further be designed in such a manner that when the testing result is or remains deficient, the nuclear fuel rod is rejected by conveying it away to a lay-off location provided for this purpose.

Since a direct visual observation of the welding operation, even with such automation, appears desirable, but on the other hand the combination of welding and X-ray checking requires a suitable shielding of the apparatus, it is in some cases preferable to employ a conventional mirror system or some other means for permitting the observation of the welding operation from the outside.

For further describing the method and apparatus according to the invention, reference will be had to the accompanying drawing in which:

FIG. 1 illustrates schematically a welding and checking device according to the invention in which checking by X-rays is effected on a reflection principle.

FIG. 2 shows schematically and partly in section a welding apparatus according to the invention operating on a penetrating ray principle.

FIG. 3 illustrates schematically and partly in section another welding and checking apparatus according to the invention also operating on a penetrating ray principle.

The same reference numerals are used in all illustrations for denoting functionally similar components respectively.

Referring to FIG. 1, there is shown an envelope tube 2 of a nuclear fuel rod. The tube is rotatably held in the illustrated position by means of a clamp or other jig. An end cap 21 coaxially mounted on one end of the envelope tube 2 is to be welded thereto with the aid of the tungsten eelctrode 3. The welding speed, for example, is 30 rotations per minute. The resulting weld 30 is being irradiated by a focused X-ray R. The rays R' reflected and strayed by the material of the weld impinge upon a radiation detector 9. The X-ray may be directed onto the welding location at an angle of about 45°, and the radiation detector, such as a counting tube and a diaphragm system, may accordingly be directed 45° onto the point of incidence of the radiation on the weld. The output current of the radiation detector 9, upon amplification, is supplied to indicator unit 4 which may be equipped with means for recording the measured intensity values. The indicator 4 unit is schematically shown connected by a control line 41 with a work control unit 5 which controls the rotational motion of the envelope tube 2 as well as the conveyance of the completely welded and checked tube assembly to a receiving locality for satisfactory products or selectively to a lay-off locality for products rejected as defective. As indicated at 42, the indicator unit 4 is further connected to the welding control unit 6 which controls the beginning and termination of the welding operation, as well as the corresponding welding currents and, if necessary, the electrode spacing from the workpiece. The control may be set differently, depending upon whether the first welding seam is being welded or a previously welded seam is being corrected by subsequent weldong. The X-ray apparatus furnishing the ray R, being of the conventional type used for industrial testing purposes, is not illustrated in FIG. 1. It may be equipped in the conventional manner with means for adjusting the respective directions of ray incidence upon the weld and upon the sensor. The wave length of the radiation may also be set conventionally to optimal values depending upon the geometry of the welding location, the material and the wall thickness.

In FIG. 2, the source of radiation, here consisting of an X-ray tube 7, issues a beam of X-rays 81 through the aperture of diaphragm structures 8 so that only a narrow beam passes through the work 2 onto the radiation detector 9. The X-ray tube, diaphragms and detector are rigidly connected with each other by structure 10. The entire assembly of rigidly interconnected components is rotatably mounted at a pivot 11. An adjusting device 12, constituted by a set screw 12 in threaded engagement with one of the diaphragm structures 8, affords an accurate setting of the ray channel relative to the work 2 and also takes care of having the entire irradiation device automatically participate in any slight displacements of the workpiece occurring during welding. As a result, always a uniformly large portion of the welding seam is traversed by the X-ray extending along a chord or almost tangentially through a marginal section of the work.

In the apparatus shown in FIG. 3, the X-ray passes at two diametrically opposite localities through the wall of the work. In this case it is advisable to commence the checking operation upon completion of a full circular weld about the periphery of the envelope tube, because otherwise the ray would pass through a welded locality at one point of the periphery and through a not yet welded locality at the opposite point. However, the X-ray may also be oriented in a somewhat slanting direction so that it no longer extends in an exactly radial plane and only one welding locality and one spot of unchanged tube material not to be welded are simultaneously traversed by the ray. In the latter case, welding and checking may occur simultaneously. It will be understood that devices of the type shown in FIG. 3 may also be provided with adjusting and feeler devices (such as items 10, 11 and 12) which permit adjustment in axial and radial direction respectively and which, as in the case of FIG. 2, entrain the irradiation equipment in the event of any irregularities in the rotational movement of the work 2.

The methods and apparatus according to the invention as exemplified by FIGS. 1 to 3 operate much faster than those heretofore known and furnish the desired results substantially independent of any particular skill of the attending personnel. In analogy to the examples described, the methods and apparatus are also applicable to other workpieces and other shapes of welding seams. Of course, other types of radiation sources are likewise applicable, for example radioactive isotopes or neutron sources. In each particular case the particular equipment used for performing the method is preferably chosen in dependence upon the shape and material of the workpieces and the thickness of the weld to be produced. The method affords not only a continuous radial sensing and testing of the weld quality, but also a continuous axial testing. This effected for example with the aid of a continuous slight axial feed movement between the work and the checking ray, or by imparting between he work and the checking device a feed step after each rotation of the weld.

To those skilled in the art it will be obvious upon a study of this disclosure that our invention permits of various other modifications and hence may be given embodiments other than those particularly illustrated and described herein, without departing from the essential features of the invention and within the scope of the claims annexed hereto.

We claim:

1. In the method of coaxially joining tubular workpieces, such as the end cap with the envelope tube of a nuclear fuel rod, by electrically welding a peripheral seam and checking the weld quality by radiation, the improvement which comprises the steps of rotating the workpieces about their axis at substantially constant speed within a protective atmosphere and adjacent to a welding electrode to produce the weld, simultaneously subjecting the weld in still hot condition to continuous radiation checking to obtain an indication of weld quality, and effecting a work control in accordance with said indication.

2. The method according to claim 1, wherein said checking is effected by applying X-rays to the weld.

3. The method according to claim 1, wherein said work control comprises the step of correcting the welding operation.

4. The method according to claim 1, wherein said indication-responsive work control comprises the step of rejecting excessively defective workpieces.

5. The method according to claim 1, wherein said work control is effected manually.

6. The method according to claim 1, wherein said work control comprises the step of controlling both the electrical operation of said electrode and the rotation of the workpieces in dependence upon said indication.

7. Apparatus for coaxially joining tubular workpieces by welding a peripheral seam and simultaneously checking the weld according to the method of claim 1, comprising journalling means for rotatably holding the joined workpieces for rotation about their common axis, welding means having an electrode positioned relative to said journalling means so as to be adjacent to the seam location of the joined workpieces whereby said electrode produces a peripheral weld during workpiece rotation; a source of radiation for checking the weld, said source being oriented toward the weld produced by said electrode, and radiation-responsive means having a radiation sensor exposed to radiation from said source and situated at a locality radiatingly past the weld, whereby the response of said latter means is indicative of the weld quality to afford checking the weld during its production.

8. In apparatus according to claim 7, said source of radiation being an X-ray tube.

9. In apparatus according to claim 7, said source being located at the workpiece side opposite said electrode and having a ray-issuing direction extending substantially in an axial plane of the journalling means at an inclination of approximately 45° toward the axis with a point of incidence at the locality of the weld, whereby the intensity of the ray reflected at the weld is indicative of the weld quality, said sensor being oriented in said plane at a substantially complementary angle to said inclination for response to the reflected ray.

10. In apparatus according to claim 8, said source comprising diaphragm means for limiting the cross section of the ray and having a ray-issuing direction which forms a chord relative to the peripheral seam being welded so as to pass the ray through a marginal section of the weld only, said source with said diaphragm means and said sensor being rigidly connected with each other and jointly forming a unit displaceable as a whole for adjustment relative to the work.

11. In apparatus according to claim 8, said source and said sensor being located substantially at diametrically oposite sides of the work.

12. In apparatus according to claim 8, said journalling means forming a channel for radiation, said source and said sensor being located at opposite sides of said channel for having the radiation pass from the source through the channel and the weld to the sensor.

13. In apparatus according to claim 7, said radiation-responsive means comprising control means for controlling the welding operation, said control means being connected to said sensor to operate in dependence upon the result of the checking.

References Cited

UNITED STATES PATENTS

| | | | |
|---|---|---|---|
| 3,209,121 | 9/1965 | Manz | 219—125 |
| 3,240,913 | 3/1966 | Schubert | 219—60 |
| 3,262,006 | 7/1966 | Sciaky et al. | 219—125 |
| 3,283,120 | 11/1966 | Spruck | 219—121 |
| 3,290,479 | 12/1966 | Avedissian | 219—109 |
| 3,299,250 | 1/1967 | Vilkas et al. | 219—124 |

RICHARD M. WOOD, *Primary Examiner.*

W. D. BROOKS, *Assistant Examiner.*

U.S. Cl. X.R.

219—61